(12) United States Patent
Chen et al.

(10) Patent No.: US 7,561,848 B2
(45) Date of Patent: Jul. 14, 2009

(54) APPARATUS FOR MANUFACTURING MANAGEMENT USING A WIRELESS DEVICE

(75) Inventors: Robert K. T. Chen, Stony Brook, NY (US); Mark E. Depperschmidt, Germantown, TN (US); James E. Lee, Jr., Pinckney, MI (US); Patrick Gray, Lake Orion, MI (US)

(73) Assignee: Symbol Technologies, Inc, Holtsville, NY (US)

( * ) Notice: Subject to any disclaimer, the term of this patent is extended or adjusted under 35 U.S.C. 154(b) by 750 days.

(21) Appl. No.: 10/947,938

(22) Filed: Sep. 23, 2004

(65) Prior Publication Data

US 2005/0037710 A1    Feb. 17, 2005

Related U.S. Application Data

(63) Continuation of application No. 09/801,203, filed on Mar. 7, 2001, now Pat. No. 6,838,977.

(51) Int. Cl.
*H04B 1/00* (2006.01)

(52) U.S. Cl. .................. 455/67.11; 340/5.92; 340/2.22; 235/385; 705/22; 705/28

(58) Field of Classification Search ................ 340/2.22, 340/5.92, 7.22–7.23, 7.61, 311.2, 313, 314, 340/815.4, 815.45, 815.65, 815.69, 514, 340/815.72, 994, 521, 592; 342/450, 465; 348/460; 705/9, 22–29; 700/214, 215, 221, 700/222, 236; 235/385; 455/67.11
See application file for complete search history.

(56) References Cited

U.S. PATENT DOCUMENTS

| 5,648,770 | A | * | 7/1997 | Ross ......................... 340/994 |
| 5,920,287 | A | * | 7/1999 | Belcher et al. ............. 342/450 |
| 6,127,933 | A | * | 10/2000 | Ohmura et al. .......... 340/636.1 |
| 6,313,744 | B1 | * | 11/2001 | Capowski et al. ........... 340/514 |
| 6,317,082 | B1 | * | 11/2001 | Bacon et al. ................ 342/465 |
| 6,594,470 | B1 | * | 7/2003 | Barnes et al. ............. 455/67.7 |
| 6,696,972 | B1 | * | 2/2004 | Bryans ................... 340/825.72 |
| 2002/0123921 | A1 | * | 9/2002 | Frazier ......................... 705/9 |

FOREIGN PATENT DOCUMENTS

WO    WO 00/48016    2/1999

\* cited by examiner

*Primary Examiner*—Md S Elahee

(57) ABSTRACT

A method of inventory management is described. Upon activation of a button on a wireless device, the wireless device having a light source and a transceiver with a unique media address corresponding to a unique product, the device broadcasts a first signal including an order command and the unique media address by the transceiver via a wireless medium. A central controller then receives the first signal, identifies the unique media address included in the first signal, and using a database, identifies the unique product associated with the unique media address.

12 Claims, 3 Drawing Sheets ary application is a Continuation application of U.S. patent application Ser. No. 09/801,203, filed on Mar. 7, 2001, now U.S. Pat. No. 6,838,977, which is incorporated by reference herein.

APPARATUS FOR MANUFACTURING MANAGEMENT USING A WIRELESS DEVICE

PRIORITY CLAIM

This application is a Continuation application of U.S. patent application Ser. No. 09/801,203, filed on Mar. 7, 2001, now U.S. Pat. No. 6,838,977, which is incorporated by reference herein.

BACKGROUND OF THE INVENTION

The present invention relates to an apparatus for improving manufacturing management using a wireless device.

The manufacturing process requires careful logistical planning to produce products as quickly as possible. An issue that may arise on a manufacturing floor or an assembly line is the constant need to replenish parts used in the manufacturing process. This need presents logistical difficulties in that each worker or work station may have only limited space to store the necessary parts on an assembly line. Moreover, each worker or work station may have a different number of parts and thus run out at different times on the manufacturing floor. Accordingly, the bulk of the parts used on the manufacturing floor or assembly line may be located offsite at a central parts facility. Such parts must be transported from the central parts facility to each worker or workstation on a case by case basis.

Prior art systems have attempted to solve this problem by providing a wired electronic notification system for each worker or work station. Upon realizing that a shortage of parts will occur in the near future, the worker activates the notification system to notify the central parts facility. The wired system then ascertains the identity of the worker and the type of parts needed.

The disadvantages of the wired electronic system are many. Fashioning such a system in a wired fashion adds an additional level of complication to an already complex manufacturing system. Moreover, the wired system lacks the flexibility to be quickly reconfigured based on the changing layout of a manufacturing facility.

SUMMARY OF THE INVENTION

Therefore, the proposals of the related art fail to comprehensively overcome the problems discussed above and other related problems. Advantages of this invention will be set forth in part in the description which follows, and in part will be obvious from the description, or may be learned by practice of the invention. The advantages of the invention will be realized and attained by means of the elements and combinations particularly pointed out in the appended claims.

The present invention provides an efficient wireless-based call replenishment system that is designed to order replacement parts on a real-time, as-needed basis. This system makes the manufacturing process easier by eliminating the wiring necessary to establish the prior art wired system. Such a system may also be easily reconfigured based on the changing layout of the manufacturing process.

DETAILED DESCRIPTION

Figure 1:
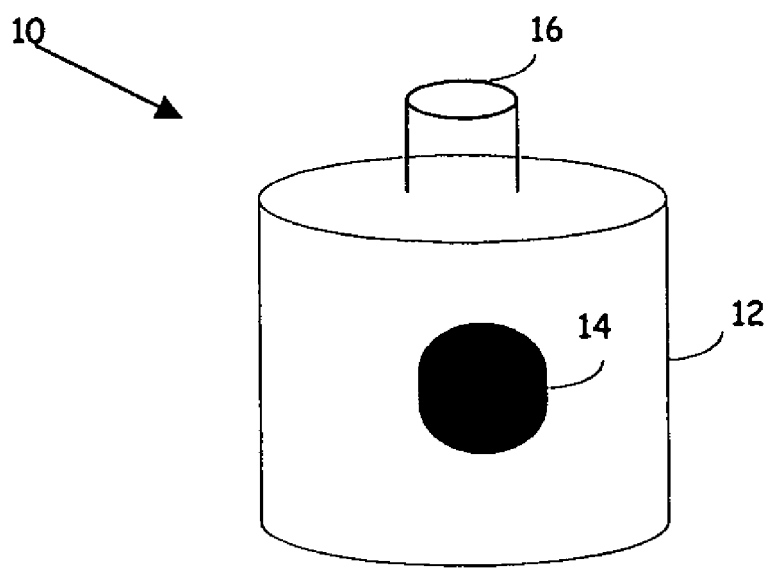
FIG. 1 illustrates a block diagram of the wireless pendant, which is an embodiment of the present invention.

As shown in FIG. 1, an embodiment of the present invention consists of a wireless pendant 10 that is designed to order replacement parts in the manufacturing process in a simple and efficient manner. FIG. 1 illustrates a wireless pendant 10 with a body 12, a push-button 16 and an LED 14.

Pendant Modes

Figure 2:
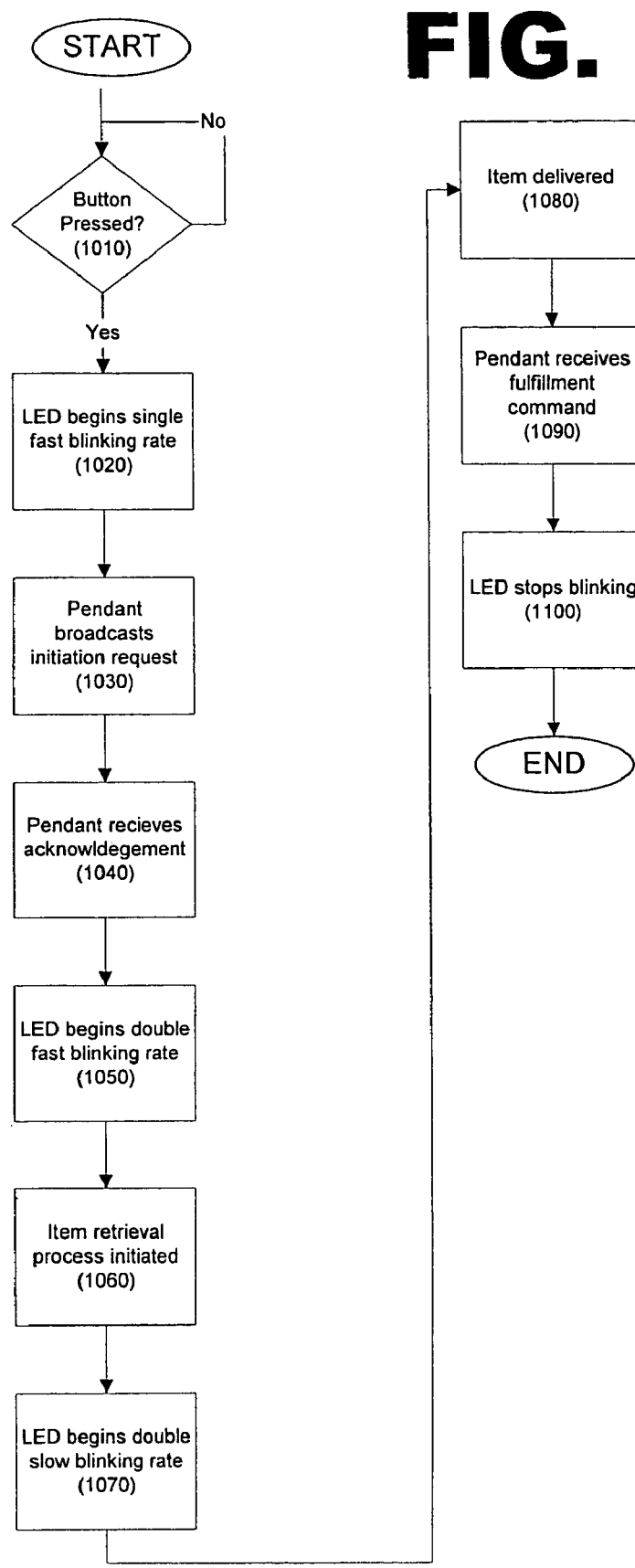
FIG. 2 illustrates a flowchart illustrating an operation of a system of the present invention.

FIG. 2 illustrates the general operation of the wireless pendant system.

When activated by the user by pressing the push-button 16 (Step 1010), the wireless pendant 10 will indicate to the user it has been turned on by beginning to blink the LED 14 (Step 1020). In one embodiment, a blink rate of 1 Hz at a 20% duty cycle (200 ms on) is proposed. Based on the activation wireless pendant 10 will "wake up" and send identification data over a wireless network. In one embodiment, the wireless network is based on the IEEE 802.11 protocol. This data will be used to uniquely identify each wireless pendant 10. The unique identification (possibly the MAC address) will be looked up against a database to determine what component and location the activated wireless pendant 10 represents (Step 1030).

Upon receipt of the data the wireless network will reply to the wireless pendant 10 that its request has been accepted (Step 1040). In one embodiment, once the reply is received the wireless pendant 10 will reduce the blink rate of the LED 14 to 0.5 Hz at 10% duty cycle (same 200 ms on) (Step 1050). It is anticipated that the time from initiation to confirmation may be 5 seconds or less. It is assumed that at this time (between Initiation and Acknowledgement) the wireless pendant 10 is awake and waiting for the network to reply to it. If the wireless pendant 10 has to stay awake for an extended period of time battery life may be reduced.

Once the wireless pendant 10 has received the acknowledgement that the wireless network has received the request the wireless pendant 10 may go to into a power save mode. At this point the system will put the request in the queue and the wireless pendant 10 status will not change until a forklift driver retrieves the request from the queue for material delivery or the requestor pushes the button again to cancel the initial request.

After acknowledgement, it is assumed that wireless card and micro can sleep (power save mode) and poll the wireless network for data (once per N minutes) for any updates. The on time during for polling may be less than 5 seconds. If it is longer battery life may be reduced, but this may be traded against a longer polling period.

Once a driver takes the request off of the queue there will be an update on the status in the network to Delivery Pending. The Delivery Pending information will be sent to the wireless network and during the next poll of the network by the wireless pendant 10 it will retrieve the updated status (Step 1060). In one embodiment, the LED 14 blink will then become a double blink at a 0.25 Hz rate (Step 1070).

After receipt of the Delivery Pending status the wireless pendant 10 will go back to a polling mode and wait for fulfillment command.

Upon delivery of the requested material the driver will change the request status to fulfillment by using the forklift terminal (Step 1080). The information from the forklift terminal will be sent to the system and a fulfillment message will be sent to the wireless network for retrieval by the wireless pendant 10 during its next poll. Upon the next wireless pendant 10 poll the wireless pendant 10 will receive the fulfillment message from the wireless network (Step 1090), shut the LED 14 (Step 1100) and shut down.

The requester may cancel an acknowledged request prior to the driver picking it up off of the queue. If the request is in the acknowledgment phase on the network and on the wireless pendant 10 the requestor may cancel it by pressing the button again. When pressed the wireless pendant 10 will send a message to the wireless network again and the network, perhaps knowing that particular wireless pendant 10 had a request in the acknowledgement phase, will reply to the wireless pendant 10 that the request has been canceled. Upon receipt of that reply the wireless pendant 10 will shut the LED 14 and return to its quiescent state.

Once a request has been picked up off the queue the request will have a status on the network of Delivery Pending, but due to the latency of the polling technique the wireless pendant 10 would still be in the acknowledgement phase. At this point the request can no longer be canceled. If the requestor did try to cancel at this point the network would respond with a message that would update the wireless pendant 10 status LED 14 indicating that the driver was in route (Delivery Pending).

A graphic depicting flash rates for each state is presented below:

| Phase | Flash Rate |
| --- | --- |
| Idle | |
| Initiation | 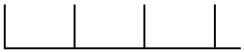 |
| Acknowledgement |  |
| Delivery Pending | 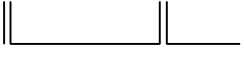 |
| Fulfillment | |
| Cancellation | |

In an alternative embodiment, an speaker may be installed in place of or in addition to using an LED 14. This would provide aural confirmation of the status of the request in the same manner as the LED 14 provides visual confirmation.

Wireless Pendant Physical Overview

In one embodiment, the wireless pendant 10 will be comprised of a housing, a serial wireless network card, an antenna, an activation button, an indicator LED 14 (on a flex or PCB) a "carrier" PCB and a battery pack. In one embodiment, a portable unit can be made using disposable batteries. The polling period N may be increased if needed to extend battery life. The polling period will determine the latency of the wireless pendant 10s status updates.

The "carrier" PCB will contain the circuitry to regulate/condition the supplied battery power and be the interface between the button, LED 14, processor and wireless card. The "carrier" PCB will have a battery threshold circuit to send a signal to the wireless card (or processor) to indicate that battery power is low and that the wireless pendant 10 requires service.

The wireless pendant 10 assembly may be a stack up with the battery on the bottom followed by the carrier PCB, the wireless card and then the antenna. The button/led circuit would be minimized (to reduce RF interference) and placed at the top of the stack. Based on this, the wireless pendant 10 will have an orientation associated with its RF performance, the accessibility of the button and the visibility of the LED 14.

Call Button

The Call Button can be broken into four major subparts, involving the design and construction of Call Button Hardware
Call Button Firmware Software
Call Button Message Server Software
Call Button Application-layer Server Call Button Hardware—this is the design and assembly of the button itself. The design consists of an enclosure, microcontroller, button, radio card, battery, and associated circuits on a PC In one embodiment, a Serial OEM wireless radio card manufactured by Symbol Technologies, Inc. (the assignee of the present application) is the key component in this design, because, unlike our other radio cards, it also contains a protocol stack. Having this all on one card saves power and money, of critical importance for his project. In a further embodiment, the card utilizes the 1 Mb frequency-hopping protocol.

Call Button Firmware Software—these are the commands issued by the microcontroller to turn on/control the radio card and button LED 14, and send messages upwards to a Message Server about status changes. To conserve power, the entire button-radio, microcontroller, etc., will turn off for periods of time, with external timing circuits firing the blinking LED 14.

Call Button Message Server—This is a layer of software, residing on a wired LAN, that accepts messages from Call Buttons, and posts to the Application-layer Server. In one embodiment, to conserve power, UDP, and not TCP, was chosen as the protocol to implement. This is because UDP is a connectionless protocol, and hence we will not waste power maintaining connections (e.g., sockets) at the Call Button end. There is not guaranteed acknowledgements with UDP, however, so this function is built into the messaging.

Call Button Application-layer Server—The application-layer Server is also a piece of software that resides on an Server. The purpose of this piece of software is to provide options to communicate with various different applications. Though GE-Fanuc's Cimplicity is well established in the auto industry, with over 50% market share, many other manufacturing environments have workers with limited WIP inventory, and hence need resupply during their shift. These environments would also benefit from a Call Button approach. Having an application-layer server separate from the Message Server allows the flexibility to address various market segments. The call button application-layer server may also be OPC compliant.

Configuration of Wireless Pendant System

Figure 3:
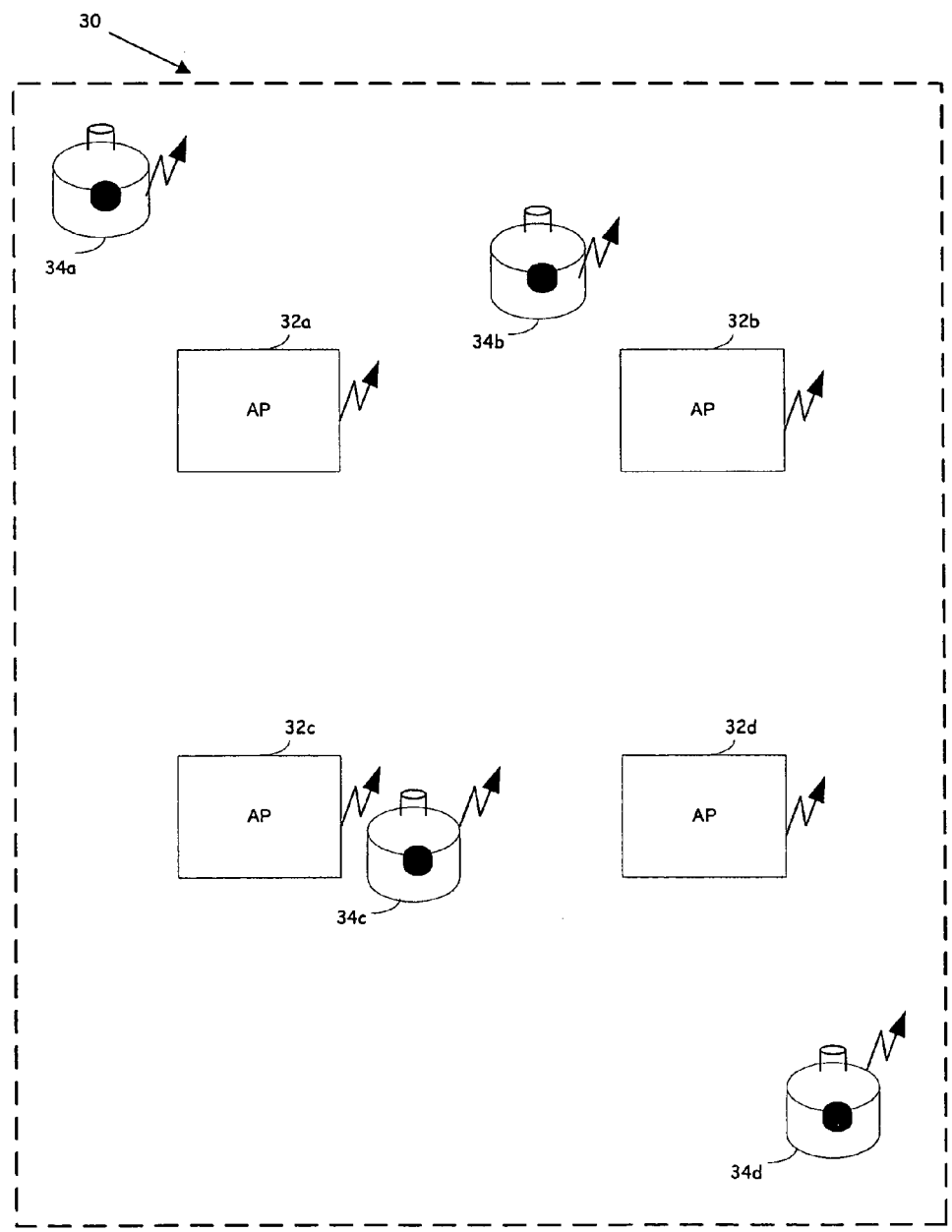
FIG. 3 illustrates a block diagram of a system implementing the present invention.

FIG. 3 illustrates a system of multiple wireless pendants illustrating the advantages of the present invention. Shown in FIG. 3 is an overhead view of a factory floor 30, which may be configurable into many different layouts depending on the assembly activities taking place therein. The factory floor 30 has a plurality of access points 32a, 32b, 32c, 32d installed at various points above the floor 30. These access points 32a, 32b, 32c, 32d are then wired to a local area network (not shown). The access points 32a, 32b, 32c, 32d communicate with the plurality of wireless pendants 34a, 34b, 34c, 34d that are strategically situated throughout the factory floor 30. The wireless pendants 34a, 34b, 34c, 34d may be secured in place using VELCRO or other hook and loop type fastener at the appropriate locations on the factory floor 30. Thus, when the configuration of the factory floor 30 is altered, the wireless pendants 34a, 34b, 34c, 34d may also be easily reconfigured.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method of inventory management, comprising:
   receiving a first signal from a wireless device including an order command and a unique address via a wireless medium, the wireless device including an indicator capable of being activated in differing manners in response to different commands;
   identifying an inventory product associated with the wireless device based on the unique address;
   initiating an order for retrieving the inventory product from a central storage facility;
   broadcasting a second signal to the wireless device including an acknowledgment command indicating the order for retrieving the inventory product has been initiated, the wireless device activating the indicator in a second manner in response to the acknowledgment command; and
   broadcasting a third signal to the wireless device including a delivery pending command responsive to retrieving the inventory product from the central storage facility, the wireless device activating the indicator in a third response in response to the delivery pending command.

2. The method of claim 1, further comprising broadcasting a fourth signal to the wireless device indicating a delivery complete command responsive to delivering the unique product to a location of the wireless device.

3. The method of claim 1, further comprising:
   receiving a third signal including a cancel command from the wireless device;
   canceling retrieval of the unique product responsive to receiving the cancel command; and
   broadcasting a fourth signal including a reset command to the wireless device responsive to canceling retrieval of the unique product.

4. The method of claim 1, further comprising:
   receiving a fourth signal including a cancel command from the wireless device; and
   ignoring the cancel command responsive to prior retrieval of the inventory product from the central storage facility.

5. The method of claim 1, wherein receiving the first signal further comprises receiving the first signal via the wireless medium using an 802.11 protocol.

6. An inventory management system, comprising:
   a plurality of wireless devices installed in a manufacturing facility each being associated with an inventory component, wherein each of the wireless devices comprises:
   a button;
   an indicator;
   a wireless transceiver; and
   a microcontroller adapted to broadcast an order request for the inventory component responsive to an activation of the button, receive notification messages indicating status of an order for the inventory component, and control operation of the indicator in differing manners responsive to the notification messages;
   at least one access point adapted to receive the order request and broadcast the notification messages; and
   a central controller coupled to the access point and adapted to issue the order for the inventory component and send the notification messages to a wireless device broadcasting the order request, and wherein the wireless device broadcasting the order request is adapted to activate the indicator in a second manner responsive to receiving an acknowledgment command, wherein the central controller is adapted to broadcast a first notification message including an acknowledgment command responsive to receiving the order command and ordering retrieval of the inventory product from a central storage facility, and wherein the central controller is further adapted to broadcast a second notification message including a delivery pending command responsive to retrieving the inventory product from the central storage facility, and the wireless device broadcasting the order request is further adapted to activate the indicator in a third manner responsive to receiving the delivery pending command.

7. The system of claim 6, wherein the central controller is further adapted to broadcast a third notification message including a delivery complete command responsive to delivering the inventory product to a location of the wireless device, and the wireless device broadcasting the order request is further adapted to activate the indicator in a fourth manner responsive to receiving the delivery complete command.

8. The system of claim 7, wherein the wireless device broadcasting the order request is further adapted to broadcast a second signal including a cancel command responsive to a reactivation of the button, the central controller is further adapted to cancel retrieval of the inventory product responsive to receiving the cancel command and broadcast a second notification message including a reset command responsive to canceling retrieval of the inventory product, and the wireless device broadcasting the cancel command is further adapted to activate the indicator in a third manner responsive to receiving the reset command.

9. The system of claim 6, wherein the indicator further comprises a light source, a first manner comprises a first blinking rate, and the second manner further comprises a second blinking rate different than the first blinking rate.

10. The system of claim 6, wherein the indicator further comprises an audible indicator, a first manner further comprises a first beeping rate, the second mariner further comprises a second beeping rate different than the first beeping rate.

11. The system of claim 6, wherein the access point and the wireless device are further adapted to communicate using an 802.11 protocol.

12. An inventory management system, comprising:
   means for receiving a first signal from a wireless device including an order command and a unique address via a wireless medium, the wireless device including an indicator capable of being activated in differing manners in response to different commands;
   means for identifying a inventory product associated with the wireless device based on the unique address;
   means for initiating an order for retrieving the inventory product from a central storage facility; and
   means for broadcasting a second signal to the wireless device including an acknowledgment command indicating the order for retrieving the inventory has been initiated, the wireless device activating the indicator in a second manner in response to the acknowledgment command; and
   means for broadcasting a third signal to the wireless device including a delivery pending command responsive to retrieving the inventory product from the central storage facility, the wireless device activating the indicator in a third response in response to the delivery pending command.

* * * * *